INVENTOR.
Edward S. Bettis
BY
Roland A. Anderson
ATTORNEY.

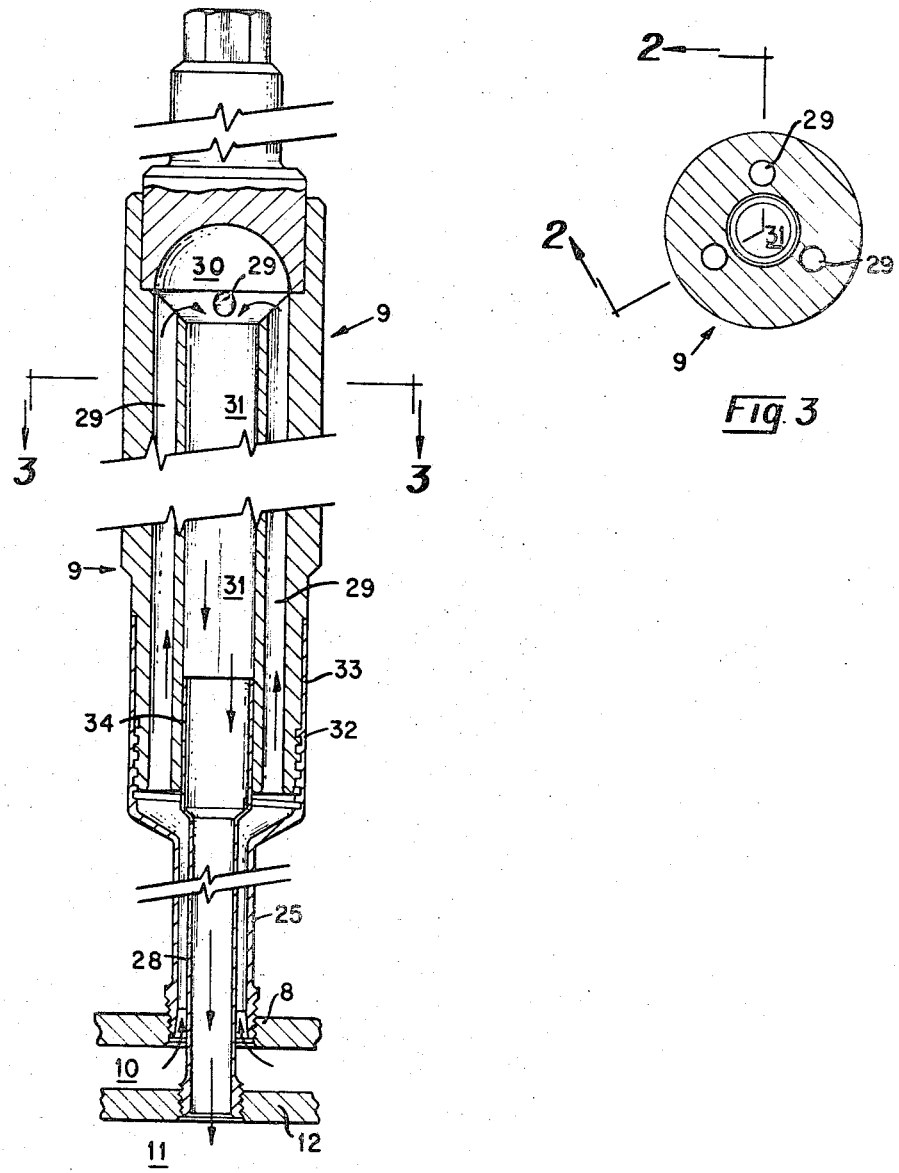

United States Patent Office 3,403,076
Patented Sept. 24, 1968

3,403,076
MOLTEN SALT BREEDER REACTOR AND FUEL
CELL FOR USE THEREIN
Edward S. Bettis, Knoxville, Tenn., assignor to the United
States of America as represented by the United States
Atomic Energy Commission
Filed Aug. 15, 1967, Ser. No. 661,177
6 Claims. (Cl. 176—18)

ABSTRACT OF THE DISCLOSURE

A molten-salt-fueled nuclear breeder reactor comprising a multiplicity of fuel cells arranged in a bundle to form an active core region. Each fuel cell comprises a vertically oriented graphite rod anchored, in cantilever fashion, at its lower end only, leaving its upper end free to move axially in response to thermal and irradiation induced growth effects. Inner and outer flow passageways for molten salt fuel extend axially through each graphite rod, terminating in a common plenum near its upper end. The lower ends of the inner and outer flow passageways communicate with separate plenums which act as intake and exhaust manifolds for the fuel cells and provide for the separation of molten salt fuel entering the fuel cells from that leaving the fuel cells. Radial support is provided to the fuel cells by graphite spheres buoyed in the blanket region surrounding the active core region. Reactivity control is provided by selectively displacing molten salt containing fertile material from a channel in the active core region.

BACKGROUND OF THE INVENTION

The invention described herein relates generally to neutronic reactors and more particularly to a molten-salt-fueled breeder reactor and fuel cell for use therein. It was made in the course of, or under, a contract with the U.S. Atomic Energy Commission.

As used in this application, the following terminology is defined below:

Active core region: The inner portion of a neutronic reactor which contains fissile material and is characterized by a multiplication constant greater than or equal to unity during reactor operation.

Blanket region: The region immediately surrounding the active core region containing fertile material for conversion into fissile material by neutron capture.

Fissile material: Material which will undergo fission with neutrons of any energy.

Fertile material: Material which can be converted into fissile material through neutron capture.

Breeder reactor or breeder: A nuclear reactor which produces fissile material identical with that used to maintain the fission chain. Further limited herein to reactors producing more fissile material than they consume.

Breeding ratio: The ratio of the number of fissile atoms produced to the same kind that have been consumed.

In the design of a molten-salt-fueled breeder reactor, it is desirable to utilize graphite core components because of the good structural and nuclear properties of graphite. Thermal and irradiation induced graphite growth provides a problem which must be overcome in reactor systems utilizing graphite components, however, before such reactor systems can be deemed acceptable. It is further desirable that in molten-salt-fueled breeder reactors the molten salt containing fissile material be kept separate from molten salt containing fertile material only. Molten salt containing fissile material will be referred to hereinafter as molten salt fuel or fuel salt, and that containing fertile material will be referred to as blanket salt.

SUMMARY OF THE INVENTION

In accordance with the invention, a molten-salt-fueled breeder reactor and fuel cell for use therein are provided wherein a multiplicity of fuel cells are arranged in a bundle to form the reactor active core region. Each fuel cell comprises an elongated, vertically oriented, graphite rod anchored, in cantilever fashion, at its lower end only. Inner and outer flow passageways for molten salt fuel extend axially through each graphite rod, terminating in a common plenum near the upper end of the rod. Separate plenum chambers communicate with the lower ends of the inner and outer passageways to provide for separation of molten salt fuel entering the fuel cell from that leaving. Radial support is provided to the free upper ends of the fuel cells by means of graphite spheres buoyed in molten blanket salt surrounding the bundle of fuel cells. A breeder reactor system is thus provided wherein graphite core components are free to grow without deleterious effect and wherein molten salt containing fissile material is kept separate from molten salt containing fertile material only.

BRIEF DESCRIPTION OF THE DRAWINGS

FIG. 2 is a vertical sectional view of a fuel cell used in the reactor of FIG. 1.

FIG. 3 is a horizontal sectional view of the fuel cell of FIG. 2.

DESCRIPTION OF THE PREFERRED EMBODIMENT

Figure 1:
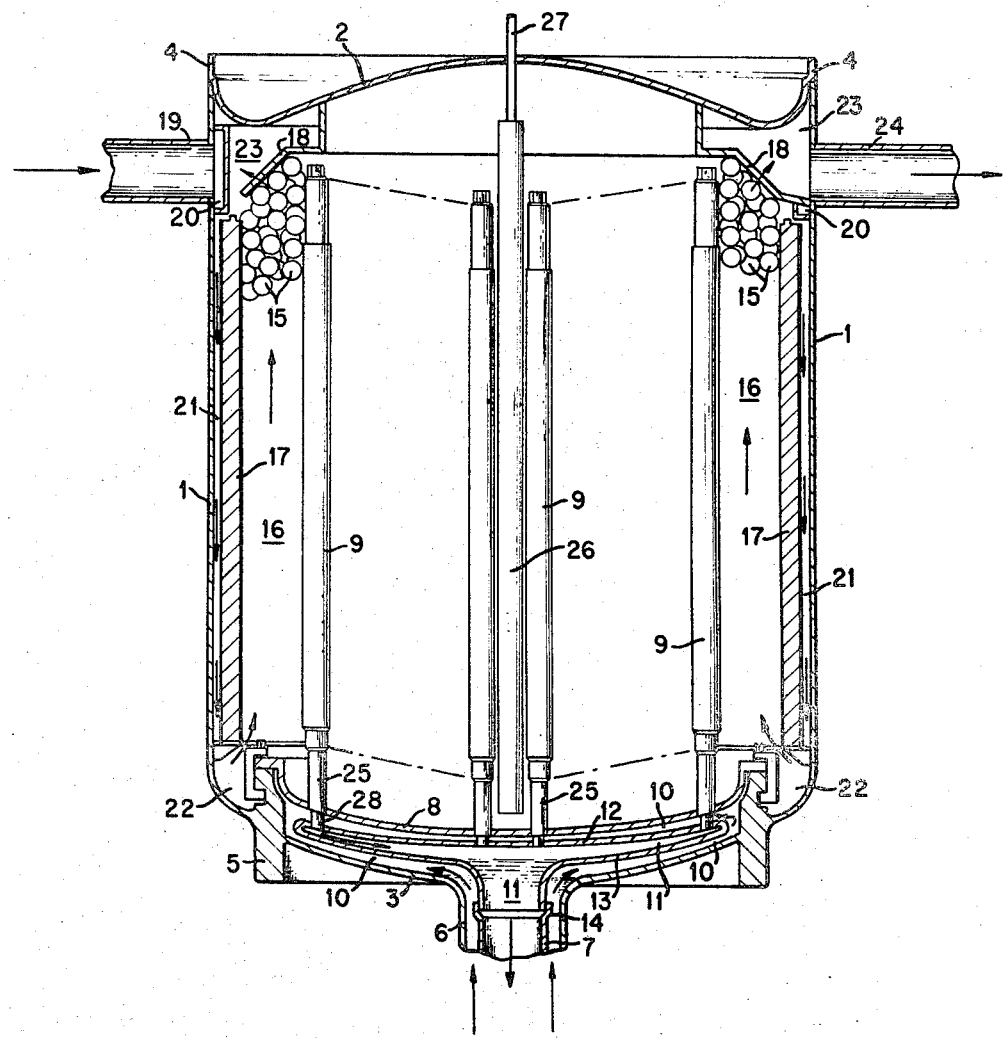
FIG. 1 shows schematically, in vertical section, a molten-salt-fueled breeder reactor designed in accordance with the invention.

A molten-salt-fueled breeder reactor designed in accordance with the invention is illustrated in vertical section in FIG. 1. The reactor vessel comprises a cylindrical body 1 with dished heads 2 and 3 closing its top and bottom ends, respectively. Dished head 2 is arranged with an upwardly extending peripheral flange 4 to facilitate its removal from cylindrical body 1 by grinding away the welded joint therebetween. A massive supporting ring 5 provides a mechanical mounting for the vessel and reactor components disposed therein. From the center of dished head 3 closing the bottom of the vessel, a fuel line comprising an inlet pipe 6 integrally joined to dished head 3 and an outlet pipe 7 concentric with pipe 6, communicates with a fuel heat exchanger (not shown).

Inside the reactor vessel, a dished head 8 sealably engages supporting ring 5. Dished head 8 contains a multiplicity of threaded perforations for threadably engaging tubular extensions from fuel cells 9 which will be described in a later reference to FIGS. 2 and 3. Dished head 8 together with dished head 3 define an inlet plenum or manifold 10 wherein fuel salt returning from the fuel heat exchanger (not shown) may be circulated through fuel cells 9. Outlet pipe 7 terminates in an outlet plenum or manifold 11 disposed within plenum 10 and comprising a dish shaped volume formed by an upper dished head 12 containing a multiplicity of threaded perforations in axial register with the perforations in dished head 8, and a lower dished head 13 integrally affixed to upper dished head 12 at its periphery. Lower dished head 13 engages outlet pipe 7 through a slip joint 14 which permits limited movement of plenum 11 relative to pipe 7 to accommodate thermal expansion. In addition, slip joint 14 facilitates removal of the reactor core in the event that reactor disassembly is desired.

The upper ends of fuel cells 9 are supported laterally by means of a multiplicity of graphite spheres 15 which are buoyed in the denser blanket salt filling blanket region 16. Blanket region 16 is defined by the radial periphery of fuel cells 9 and the radially innermost face of graphite reflector 17. Some restraint to radial movement of the upper ends of the fuel cells occurs from the buoyant forces exerted on the fuel cells themselves which tend to force the fuel cells into perfect vertical orientation.

A perforated metal retainer plate 18 prevents graphite spheres 15 from spreading onto the top of the core over fuel cells 9 where they would no longer provide lateral support to the fuel cells. The buoyant graphite spheres, being restrained from upward movement by retainer plate 18, pack together and exert lateral force against the fuel cells in a wedging action because of their spherical shape. Thus the free upper ends of the fuel cells are maintained in a desirable packed condition while remaining free to grow axially in response to thermal or irradiation induced graphite growth. Only slight abrasion of graphite spheres 15 occurs since the blanket salt which flows through the interstices of the spheres is driven by thermal convection only and does not reach turbulent flow conditions.

Blanket salt coming from a blanket salt heat exchanger (not shown) enters the reactor through inlet pipe 19 which empties into distributor 20 at the top of the reactor. The blanket salt discharges through holes provided in the bottom of distributor 20 into annular space 21 between graphite reflector 17 and cylindrical wall 1 of the reactor vessel. The blanket salt, having just been cooled, flows downward through annular space 21 and discharges into annular plenum 22 at the base of the reflector. The greater portion of the blanket salt flows upward through blanket region 16, past graphite spheres 15, and through perforated retainer plate 18 before being collected in discharge header 23 prior to returning through outlet pipe 24 to the blanket salt heat exchanger. A portion of the blanket salt which discharges into plenum 22 then flows through the interstices between the outlet tubular extensions 25 of fuel cells 9. A small amount of flow of the blanket salt occurs upward through the slight clearances between adjacent fuel cells as well as any clearances between the fuel cells and graphite cylinder 26 forming part of the reactivity control means of the reactor.

The centermost position in the active core region is occupied by reactivity control means comprising a hollow graphite cylinder 26 open at its lower end and equipped with a gas inlet 27 at its upper end. By controlling the gas pressure applied through inlet 27, blanket salt can be permitted to rise to any height desired within cylinder 26 and thereby control the reactivity of the active core region. Alternatively, a graphite rod may be used to displace blanket salt from the same core position as cylinder 26. Effective reactivity control can be achieved by axially driving the graphite rod in a conventional manner. In the event of failure of the rod drive, the rod would be lifted out of the core by the buoying action of the more dense blanket salt which would result in a reduction in reactivity, thereby providing a fail-safe shutdown mechanism for the reactor.

Graphite fuel cells 9, as shown in detail in FIGS. 2 and 3, are fabricated of graphite and contain passageways for the flow of fuel salt therethrough. Fuel salt from inlet plenum 10 flows upwardly through the annular space between tubular metal inlet extension 25 and concentrically disposed tubular metal outlet extension 28. The fuel salt then enters outer flow passageways 29 (three passageways shown) and flows upwardly therethrough to an upper plenum 30. After discharging into plenum 30, the fuel salt passes downwardly through central flow passageway 31 and tubular outlet extension 28 into outlet plenum 11. The fuel salt then flows from outlet plenum 11 through outlet pipe 7 to a fuel salt heat exchanger (not shown).

The fuel cells 9 are secured in the reactor core by threaded engagement of tubular inlet extensions 25 and tubular outlet extensions 28 with dished heads 8 and 12, respectively.

Each tubular inlet extension 25 is fixed to the graphite fuel cell 9 by a combination threaded engagement 32 for mechanical attachment and a brazed joint 33 for leak-tightness. A slip joint 34 is provided between tubular outlet extension 28 and central flow passageway 31 to provide for differential axial thermal expansion between tubular extensions 25 and 28. Any leakage of fuel salt through slip joint 34 is negligible in comparison with the flow of fuel salt through the fuel cell.

Corrosion resistant base alloys such as those described in U.S. Patent No. 2,921,850 are suitable for metal core components such as tubular extensions 25 and 28, and dished heads 8, 12, and 13. Other reactor components such as ring 5, the reactor vessel and all piping which is exposed to either the fuel or blanket salt may be fabricated of the same material.

Technical specifications for a 250 mw. (electrical) molten salt fueled reactor made according to the invention substantially as shown in the drawings are listed in the table below.

Table

| | |
|---|---|
| Average core power density, kw./liter | 39 |
| Power, mw. (thermal) | 556 |
| Reactor vessel diameter, ft. | 12 |
| Reactor vessel height, ft. | 17 |
| Active core diameter, ft. | 8 |
| Active core height, ft. | 10 |
| Active core volume, ft.$^3$ | 503 |
| Volume fraction of fuel salt in core | 0.165 |
| Volume fraction of blanket salt in core | 0.06 |
| Volume fraction of graphite in core | 0.775 |
| Thickness of blanket region, ft. | 1.5 |
| Fraction of salt in blanket | 0.60 |
| Breeding ratio | 1.07 |
| Fuel yield, percent/yr. | 6.02 |
| Fuel cycle cost, mills/kw. hr. | 0.43 |
| Fissile inventory, kg. | 218 |
| Fertile inventory, kg. | 43,000 |
| Specific power, mw. (thermal)/kg. | 2.55 |
| Number of fuel cells | 336 |
| Velocity of fuel salt in core, f.p.s. | 6 |
| Average neutron flux of energy greater than 100 kev., neutrons/cm.$^2$-sec. | $1.5 \times 10^{14}$ |

Fuel salt composition, mole percent:

| | |
|---|---|
| LiF | 63.6 |
| BeF$_2$ | 36.2 |
| UF$_4$ (fissile) | 0.22 |

Blanket salt composition, mole percent:

| | |
|---|---|
| LiF | 71 |
| BeF$_2$ | 2 |
| ThF$_4$ | 27 |
| UF$_4$ (fissile) | 0.0005 |

Fuel salt volume, ft.$^3$:

| | |
|---|---|
| Reactor active core region | 83 |
| Plena | 24 |
| Fuel cell tubular inlet and outlet extensions | 8.5 |
| Heat exchangers and piping | 105 |
| Processing | 8.8 |
| Total | 229.3 |

| | |
|---|---|
| Radial peak to average flux ratio | 1.58 |
| Axial peak to average flux ratio | 1.51 |

The above description of the invention was offered for illustrative purposes only, and should not be interpreted in a limiting sense. It is intended rather that the invention be limited only by the claims appended hereto.

What is claimed is:

1. A molten-salt-fueled breeder reactor comprising:
  (a) a multiplicity of elongated, vertically oriented, graphite rods arranged in a bundle, said rods being provided with axially extending inner and outer flow passageways;

(b) means engaging the lower ends of said rods for effecting passage of molten salt fuel through said inner and outer flow passageways;

(c) a blanket region surrounding the radial periphery of said bundle of graphite rods, molten salt containing fertile material being disposed within said blanket region;

(d) a multiplicity of graphite spheres disposed within said blanket region to provide radial support to said graphite rods, said spheres being buoyed upward by said molten salt containing fertile material; and (e) means for retaining said graphite spheres within said blanket region.

2. The reactor of claim 1 wherein said means engaging the lower ends of said rods for effecting passage of molten said fuel through said inner and outer flow passageways comprises inner and outer concentric tubular extensions engaging the lower end of each of said graphite rods, said outer flow passageways registering with the annular spaces between said tubular extensions, said inner flow passageways registering with said inner tubular extensions, an inlet plenum communicating with the annular spaces between said tubular extensions, and an outlet plenum communicating with the interior of said inner tubular extensions.

3. The reactor of claim 2 wherein said outlet plenum is disposed within said inlet plenum, said inner tubular extensions extending through said inlet plenum to said outlet plenum.

4. The reactor of claim 3 wherein said inlet and outlet plenums are defined by top and bottom dished heads, and wherein the top dished head of each of said plenums is provided with a multiplicity of perforations for threadably engaging said tubular extensions.

5. The reactor of claim 1 wherein said means for retaining said graphite spheres within said blanket region comprises a perforated metal plate disposed at the top of and extending across said blanket region.

6. The reactor of claim 1 wherein reactivity control means are provided comprising a hollow graphite cylinder vertically oriented within said bundle of graphite rods, and gas pressure transmitting means for injecting gas into said hollow graphite cylinder to selectively alter the level of molten salt containing fertile material therein, whereby changes in the level of said molten salt containing fertile material effects a change in the reactivity of the reactor.

References Cited

UNITED STATES PATENTS 3,262,856  7/1966  Bettis _____ 176—49

BENJAMIN R. PADGETT, *Primary Examiner.*

H. E. BEHREND, *Assistant Examiner.*